Oct. 17, 1967  G. W. QUAST  3,347,382
BAR SCREEN WITH IMPROVED RAKE WIPING MECHANISM
Filed Jan. 18, 1965

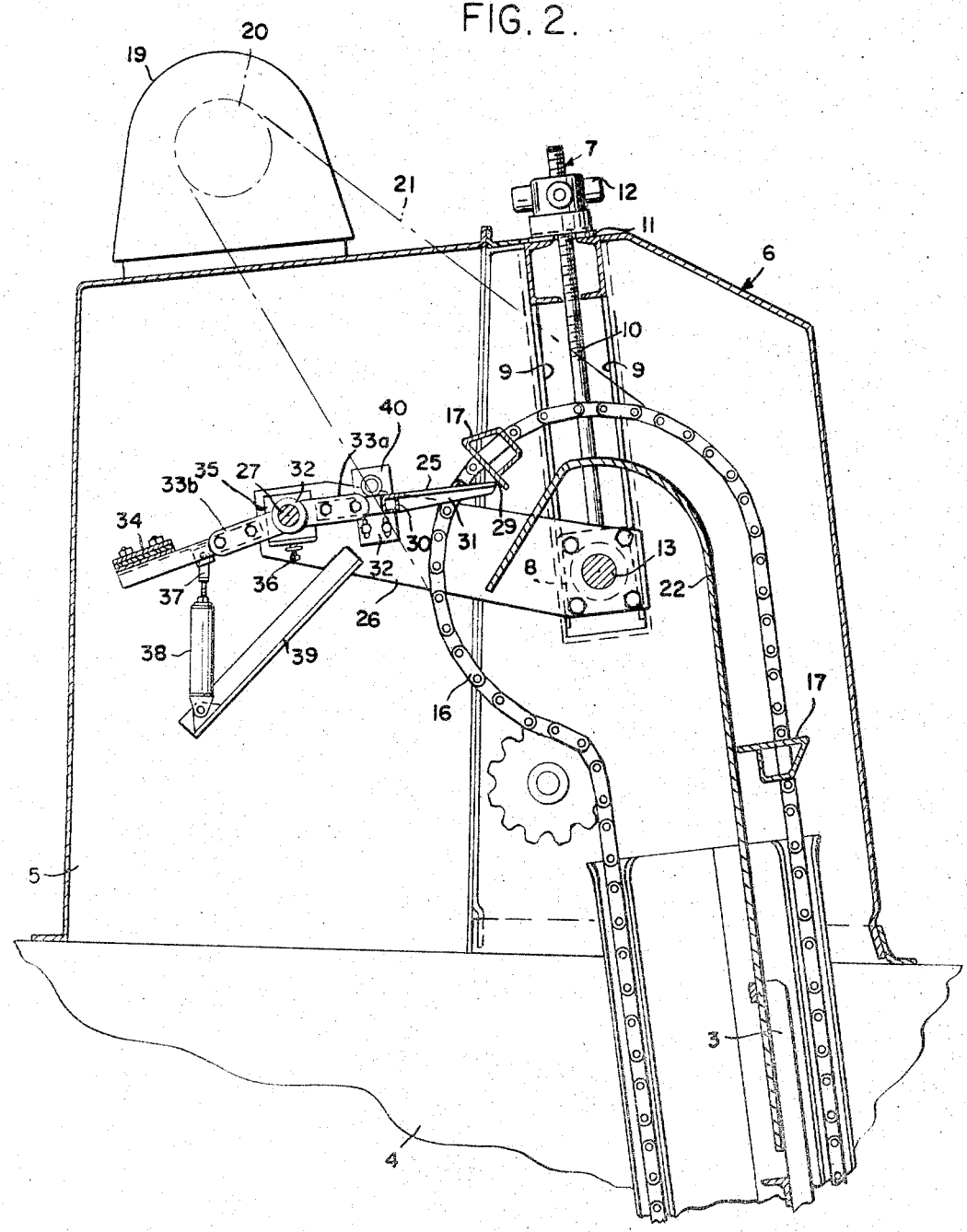

United States Patent Office 3,347,382
Patented Oct. 17, 1967

3,347,382
BAR SCREEN WITH IMPROVED RAKE WIPING MECHANISM
Gilbert W. Quast, Brookfield, Wis., assignor to Rex Chainbelt Inc., Milwaukee, Wis., a corporation of Wisconsin
Filed Jan. 18, 1965, Ser. No. 426,241
7 Claims. (Cl. 210—159)

ABSTRACT OF THE DISCLOSURE

In this bar screen, a take-up is provided for adjusting the location of the head shaft on which the sprockets are mounted in order to create the proper tension on the chain strands which carry the bar rake. To maintain proper spacial and functional relationship between the bar rake and the rake wiping means before and after tension adjustment, the rake wiping means is pivotally mounted on a pair of arms which are rigidly connected to the bearing blocks supporting the ends of the head shaft. Accordingly, movement of the bearing blocks during take-up of the bearings does not alter the specified relationship of the wiper to the rake bar.

---

Figure 1:
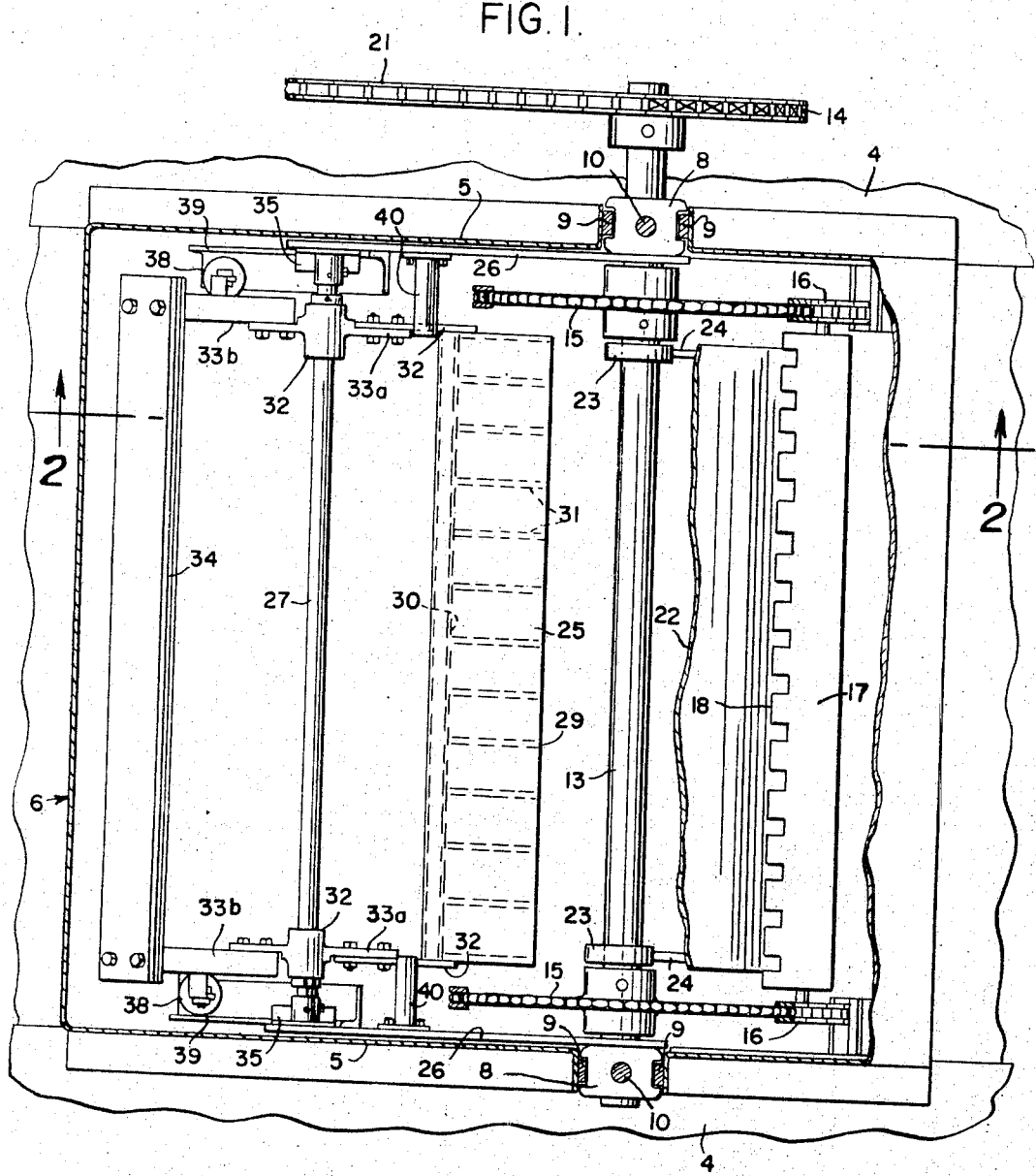

This invention relates to mechanically cleaned bar screens such as are particularly employed in sewage treatment, industrial and other plants for removing the relatively large objects or debris from the sewage preparatory to its treatment.

Such bar screens generally include parallel chains carrying one or more rakes for automatically removing the screenings from the bars. The chains carry the rakes past a rake wiping means for removing the debris from the rakes. The mechanical relationship between the rakes and the wiping means must remain constant, and when tightening of the chain by moving the head sprocket changes said mechanical relationship, a relocation of the wiping means to reestablish said mechanical relationship is required.

The principal object of this invention is to provide an improved rake wiping mechanism whereby the mechanical relationship of the rakes and the wiping means remains constant notwithstanding any change in location of the head sprocket which may be necessary to maintain adequate chain tension.

A preferred form of the apparatus is illustrated in the accompanying drawings constituting a part of this specification, in which:

FIGURE 1 is a plan view of the upper portion of a typical, mechanically-cleaned bar screen installation. Parts of the bar screen are removed or in section to show the rake wiping mechanisms; and FIG. 2 is a section taken along line 2—2 of FIGURE 1 showing the upper part of the bar screen and part of the channel. Parts of the bar screen including one of the head sprockets have been removed or broken away and are sectioned to show one of the supporting arms for the rake wiping mechanism.

Referring to the drawings, the bar 3 shown in part in FIG. 2 is one of a series of spaced, vertical bars comprising the screen which is disposed in the channel defined by the concrete side walls 4 also shown in part. Each side 5 of the upper portion of the housing 6 is supported on the side walls 4 of the channel. Housing 6 serves as the supporting frame which carries the take-up device 7 including the bearing block 8 movable between the two spaced, parallel guides 9 fixed to housing 6. The take-up screws 10 are connected to the corresponding bearing blocks 8 and extend upwardly between the guides 9 and through the bearing plate 11 supported on cross beams located at the upper ends of the guide bars 9. The upper end of each take-up screw 10 is fitted with a nut 12 which rests on plate 11 and supports each bearing block 8 between its respective guides 9.

The transversely extending head shaft 13 is journally supported by bearing blocks 8, and one end thereof projecting from one bearing block 8 is fitted with the driven sprocket 14.

Head sprockets 15 are fixed on head shaft 13 intermediate the bearing blocks 8 and carry the parallel, endless chains 16, which chains mount a series of rake elements 17. Each of said rake elements 17 extends between and has its respective ends appropriately attached to chains 16 and is provided with teeth 18 disposed to fit between the bars 3 of the screen for removal of the debris therefrom.

The motor 19 is fitted with a drive sprocket 20 which is connected to sprocket 14 by the drive chain 21 so that the motor 19 drives the chains 16 and the rake elements 17 connected thereto.

The deadplate 22 is journally supported on the head shaft 13 intermediate the head sprockets 15 by a pair of spaced bearings 23, each of which carries a bracket 24 fixed to the underside of a curved upper end portion of deadplate 22. Such support is similar to that disclosed in prior United States Patent No. 2,102,570. The lower end of the deadplate 22 is slidably disposed behind the upper end of the bar screen for movement with the head shaft 13 when the latter is adjusted upwardly or downwardly. Deadplate 22 prevents debris and the like, which is carried upwardly from the bar screen by the rake element 17, from slipping therefrom and dropping into the screened water.

The rake wiping mechanism including the wiping blade 25 is located in housing 6 and to the rear of the bar screen, as shown in the drawings, and is disposed to remove debris carried by each rake element 17 as it traverses the rearward sector of head sprockets 15; the rake element, in turn, traverses the face of wiping blade 25 to remove any screenings therefrom that may have been transferred to the blade. Screenings that are dislodged by and from the wiping blade 25 drop into a suitable receptacle or onto a conveyor belt, not shown.

The operation of the rake wiping mechanism is substantially the same as that disclosed in United States Patent No. 2,978,105. However, as disclosed in that patent, the rake wiping mechanism is pivotally carried by the upper portion of the housing. Since the relationship of the wiping blade to the traveling rake elements must remain constant after initial, proper, alignment, any movement of the head sprocket to take up chain slack will disrupt such mechanical relationship and require a realignment of the entire rake wiping mechanism to said proper, mechanical relationship.

According to the present invention, the entire rake wiping mechanism is carried by the bearing blocks 8 and includes a frame having two mounting arms 26 and the cross member 27. The corresponding ends of mounting arms 26 are fixed to the faces of bearing blocks 8 directed inwardly of housing 6. Accordingly, when movement of head sprocket 15 is required, as for example to take up chain slack, the nuts 12 of the take-up device 7 are tightened causing the respective bearing blocks 8 to move upward and carry therewith head shaft 13, sprockets 15 and the entire rake wiping mechanism. In this manner, a constant, proper mechanical relationship is maintained between the rake wiping mechanism and the rake elements.

Each mounting arm 26 may be secured to the respective bearing block 8 as by means of the screws shown and arranged around a hole in the arm through which shaft 13 extends. The mounting arms 26 extend from blocks 8 between sides 5 of housing 6 and the sprockets 15 to the rear of the housing where they support the rake wiping mechanism.

The wiping blade 25 has a straight wiping edge 29 and a flat upper surface and is reinforced at its underside by tubular member 30 and ribs 31 extending therefrom toward edge 29. The bearings 32, which are turnable on cross member 27, are provided with oppositely extending segmented lever arms 33a and 33b respectively. Blade 25 is carried by lever arms 33a, and the counterweight 34 is oppositely carried by lever arms 33b. The ends of cross member 27 are provided with vertically adjustable brackets 35 which are secured to the respective ends of mounting arms 26. Each arm 26 is provided with a vertical adjustment screw 36 for adjusting the positions of brackets 35 and the cross member 27 as may be required.

One element of a conventional fluid shock absorbing or cushioning device 37 is pivotally connected to each lever arm 33b; the other element 38 is pivotally connected to the bracket 39 appending from and affixed to each mounting arm 26.

After the wiping blade has been engaged by the rake and moved downwardly therewith, the return motion of the wiping blade 25 caused by counterweights 34 is checked by the adjustable stops 40 fixed to each mounting arm 26 and disposed to contact the upper part of arms 33a.

The bearing blocks 8 are not subject to turning by the offset weight of the wiping blade mechanism because the turning movement applied to the bearing blocks 8 by the mounting arms 26 is exceedingly small relative to the dead weight supported by the bearing blocks 8 and take-up screws 10.

The novelty of the present invention is exemplified by the fact that the head shaft 13 can be moved up or down without necessitating readjustment of the wiper blade mechanism. This particular mounting insures a constant, proper, mechanical relationship between the wiping blade 25 and the surface of the rake element 17 regardless of the amount of adjustment necessary to take up slack in the endless chains 16. Once the brackets 35 and stops 40 are adjusted to provide the proper, mechanical relationship of the wiping blade 26 with the rake element 17, such relationship will thereafter be maintained indefinitely irrespective of the adjustment or differences of adjustment of the head sprockets 15 for proper chain tensioning.

Various modes of carrying out the invention are contemplated as within the scope of the following claims particularly pointing out and distinctly claiming the subject matter which is regarded as the invention.

I claim:

1. In screening apparatus for liquids comprising a supporting frame, a bar screen carried by said frame, take-up bearing blocks mounted in said frame, a head shaft journally carried by said bearing blocks, parallel, endless chains carried by said head shaft, a rake for cleaning said screen operatively connected to and between said chains, and a wiping blade mechanism for removing screenings from said rake including a wiping blade movable with respect to its mounting means and mounting means rigidly fastened to said movable bearing block to maintain proper operating relationship of the wiping blade mechanism with respect to the moving rake irrespective of such movement of the head shaft as occurs when the bearing blocks are moved to take up chain slack.

2. In an apparatus for screening liquids comprising a supporting frame, a bar screen carried by said frame, movable take-up bearing blocks carried by said frame, a conveyor including a head shaft journally carried by said bearing blocks, endless chain carried by said head shaft and a rake for cleaning said bar screen connected to and between said chains, mounting arms having ends respectively connected to said bearing blocks, and a wiping blade mechanism for cleaning said rake pivotally connected to the other ends of said mounting arms whereby proper operating relationship between the wiping blade mechanism and the rake remains unchanged after the head shaft is moved to take up chain slack.

3. In a bar screen for removing debris from a waste stream comprising a supporting frame having two sides, a take-up device including a bearing block mounted on each of said sides, a conveyor including a head shaft journally carried by said bearing blocks, endless chains carried by said headshaft and a rake for cleaning the bar screen connected to and between said chains; a wiping blade mechanism comprising two mounting arms having corresponding ends fixed to said bearing blocks, a wiping blade pivotally connected to the other ends of said mounting arms and disposed to be engaged and moved from its normal position by said rake, and means providing return of said wiping blade to its normal position, said wiping blade mechanism being entirely supported by said bearing blocks and movable therewith to maintain the wiping blade mechanism in proper mechanical relationship with the rake irrespective of any movement of the bearing blocks effectuated by the take-up device.

4. In a cleaning rake and rake wiping mechanism for removal of debris from a bar screen including spaced endless chains carrying the rake therebetween and shaft mounted drive sprockets over which the chains operate and the rake is carried and inverted for discharge of the debris, the wiping mechanism further including a wiping blade having pivotal mounting and motion limiting means, a vertically movable bearing block in which each end of the sprocket shaft is journalled and supported and rigid arms projecting from said bearing blocks to which said pivotal mounting and motion limiting means are attached for vertical movement as a unit with that of the shaft mounted sprockets as for chain tension adjustment and take-up for wear.

5. In a bar screen for removing debris from a waste stream including a housing having sides, a takeup device including a bearing block movably mounted on each of the two opposite sides of said housing, a conveyor including a head shaft journally carried by said bearing blocks, endless chains carried by each head shaft and a rake for cleaning the bar screen connected to and between said chains; a wiping blade mechanism entirely supported by said bearing blocks comprising a frame having two mounting arms, corresponding ends of said mounting arms being fixed to said bearing blocks within the housing, vertically adjustable brackets attached to other ends of said mounting arms, a wiping blade disposed to be engaged by and move downwardly with said rake as the latter is carried by said chains over the sprockets downwardly in the inverted position, a pair of spaced lever arms pivotally connected intermediate their ends to said adjustable brackets and having corresponding ends carrying said wiping blade, counterweights fitted to the other ends of said lever arms, cushioning means connected between said mounting arms and said lever arms, and adjustable stops connected to each of said mounting arms and disposed to contact said lever arms to provide a positive check on the return movement of said wiping blade effected by said counterweights, said brackets and stops being initially adjustable to locate and dispose the wiping blade in close parallel relation to the rake, said entire rake wiping mechanisms being thereafter disposed to move vertically as a unit with the bearing blocks.

6. In a bar screen for removing debris from a waste stream including a housing having sides each provided with spaced, parallel, vertical guides, bearing blocks movably carried between said guides, a take-up screw and nut supported by said housing and supporting each block between the respective guides, a head shaft journally carried by said bearing blocks, a pair of head sprockets fixed to said head shaft within said housing, endless chains carried by said head sprockets, a rake for cleaning the bar screen connected to and between said chains; a wiping blade mechanism entirely supported by said bearing blocks and comprising two mounting arms having corresponding ends thereof fixed to said bearing blocks within said housing, vertically adjustable brackets connected to the other end of said mounting arms, a pair of spaced lever arms pivotally connected intermediate their ends to said adjustable brackets, a wiping blade connected to and between the respective ends of said lever arms and disposed to be engaged by and move downwardly with said rake as the latter is carried by said chains over the sprockets downwardly in the inverted position, counterweights fitted to the other ends of said lever arms, cushioning means connected between said mounting arms and said lever arms, and adjustable stops connected to each of said mounting arms and disposed to contact said lever arms to provide a positive check on the return movement of said wiping blade effected by said counterweights, said brackets and stops being initially adjustable to locate and dispose the wiping blade in close parallel relation to the rake, said entire rake wiping mechanisms being thereafter disposed to move vertically as a unit with the bearing blocks and maintain proper wiping alignment with the rake even after the bearing blocks have been moved for proper chain tensioning.

7. In a bar screen for removing debris from a waste stream including a housing having sides each provided with spaced, parallel, vertical guides, bearing blocks movably carried between said guides, a take-up screw and nut supported by said housing and supporting each block between the respective guides, a head shaft journally carried by said bearing blocks, a pair of head sprockets fixed to said head shaft within said housing, endless chains carried by said head sprockets, a rake for cleaning the bar screen and connected to and between said chains; a wiping blade mechanism entirely supported by said bearing blocks comprising a frame having two mounting arms and a cross member, corresponding ends of said mounting arms being fixed to said bearing blocks within the housing, the ends of said cross members having vertically adjustable brackets connecting the cross member to the mounting arms, a wiping blade disposed to be engaged by and move downwardly with said rake as the latter is carried by said chains over the sprockets downwardly in the inverted position, a pair of spaced lever arms pivotally connected intermediate their ends to said cross member and having corresponding ends carrying said wiping blade, counterweights fitted to the other ends of said lever arms, cushioning means connected between said mounting arms and said lever arms, and adjustable stops connected to each of said mounting arms and disposed to contact said lever arms to provide a positive check on the return movement of said wiping blade effected by said counterweights, said brackets and stops being initially adjustable to locate and dispose the wiping blade in close parallel relation to the rake and said entire rake wiping mechanism being disposed to move vertically as a unit with the bearing blocks to maintain the close parallel relationship notwithstanding any bearing block movement necessary to take-up chain slack.

References Cited
UNITED STATES PATENTS 1,881,270   10/1932   Evers et al. _____ 210—162 X
2,307,601   1/1943   Nichols _____ 210—159

REUBEN FRIEDMAN, *Primary Examiner.*

F. MEDLEY, *Assistant Examiner.*